United States Patent [19]

Walton

[11] Patent Number: 5,271,634
[45] Date of Patent: Dec. 21, 1993

[54] METHOD FOR COVERING SHOPPING CARTS

[76] Inventor: Sharon A. Walton, 114 Holly Ave., Berlin, N.J. 08009

[21] Appl. No.: 852,109

[22] Filed: Mar. 16, 1992

[51] Int. Cl.⁵ .............................................. B62D 39/00
[52] U.S. Cl. ................................. 280/33.992; 160/23.1
[58] Field of Search .................... 160/23.1, 24, 290.1, 160/370.2; 280/33.992, 33.991, 33.994, 47.26, DIG. 4; 296/98, 100, 37.16

[56] References Cited

U.S. PATENT DOCUMENTS

| 2,789,863 | 4/1957 | Shimabukuro | 296/78 |
| 3,146,824 | 9/1964 | Veilleux | 160/23 |
| 3,366,414 | 1/1968 | Thompson et al. | 296/100 |
| 3,383,133 | 5/1968 | Dean | 296/98 |
| 3,819,082 | 6/1974 | Rosenvold | 220/200 |
| 3,994,505 | 11/1976 | Balha | 280/33.99 |
| 4,247,130 | 1/1981 | Paterson | 280/654 |
| 4,781,234 | 11/1988 | Okumura et al. | 160/23.1 |
| 4,898,224 | 2/1990 | Woodworth | 160/370.2 X |
| 4,960,302 | 10/1990 | Walters | 296/100 |
| 5,036,898 | 8/1991 | Chen | 160/23.1 |
| 5,054,533 | 10/1991 | Lii | 160/23.1 X |

FOREIGN PATENT DOCUMENTS

| 2532605 | 3/1984 | France | 280/33.992 |
| 2226797 | 7/1990 | United Kingdom | 280/33.992 |

Primary Examiner—Blair M. Johnson
Attorney, Agent, or Firm—Thomas A. Lennox

[57] ABSTRACT

A retractable shopping cart cover is provided that attachs through hooks permanently to the top rail of the frontwardly pivoting back rest of the infant seat of the cart. The device includes a vinyl cover spring biased to retract into a cylindrical casing when not hooked over the front edge of the cart basket frame.

8 Claims, 3 Drawing Sheets

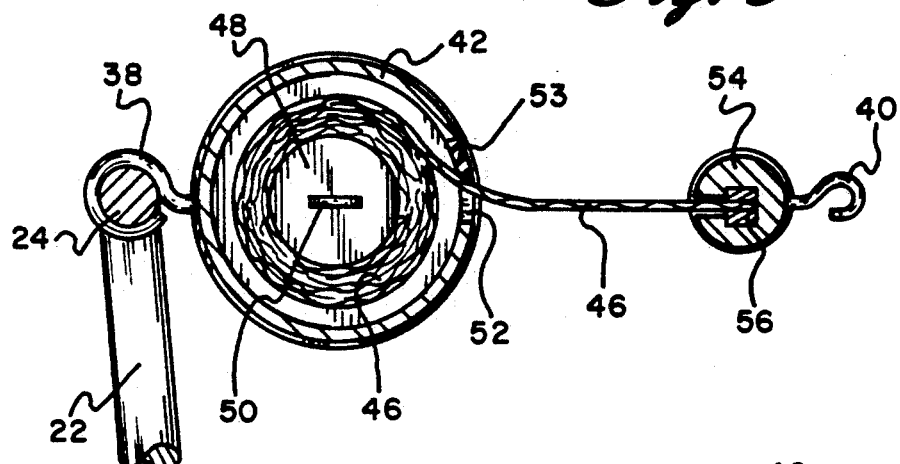
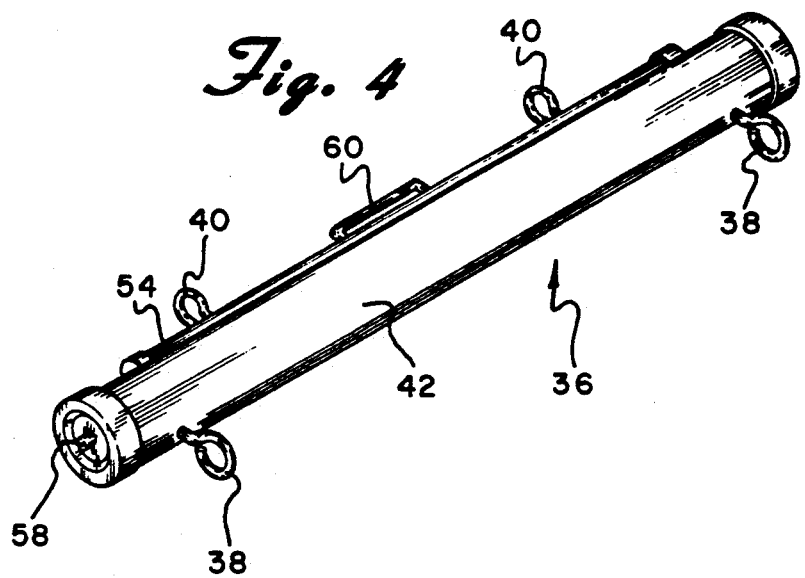
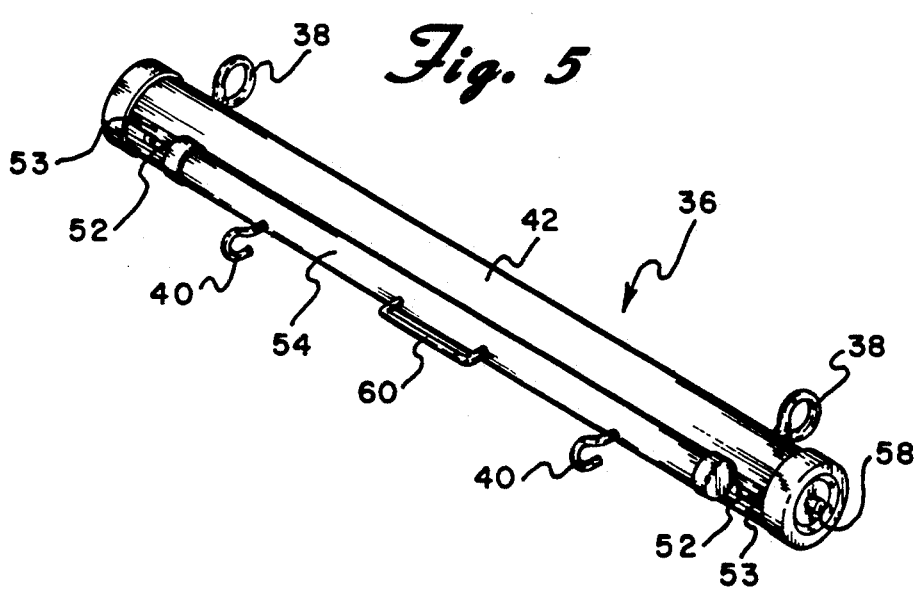

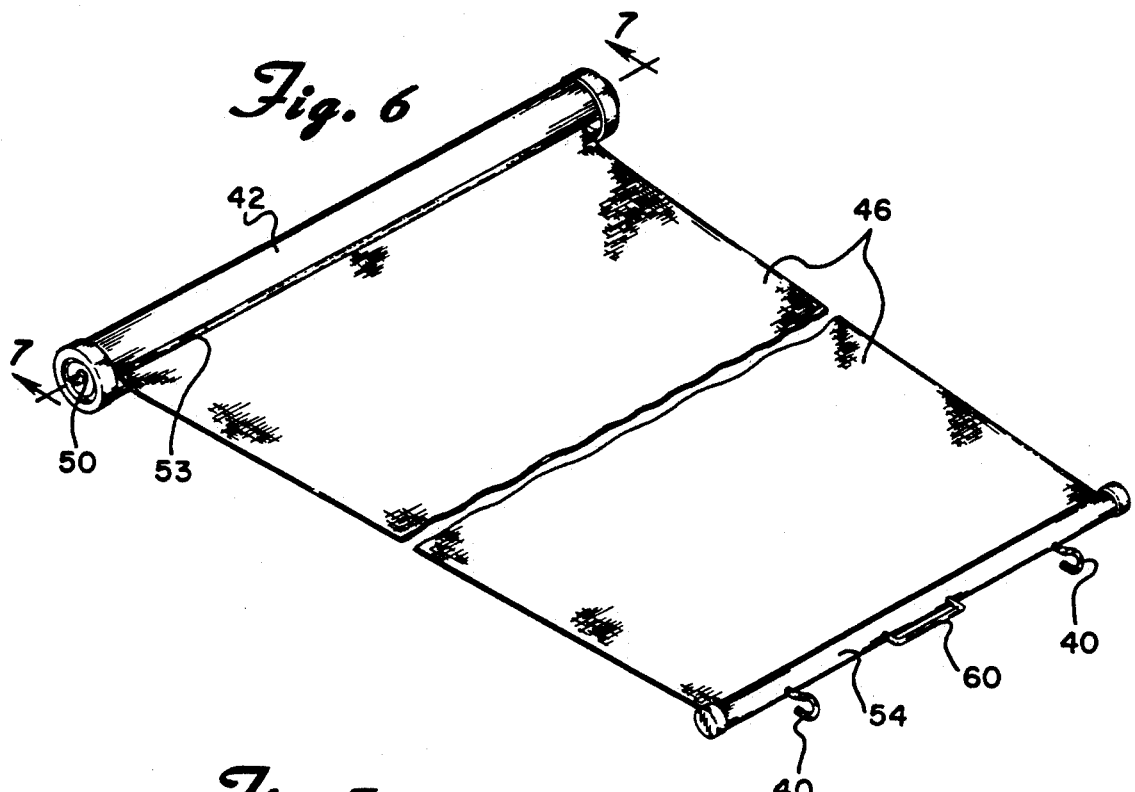
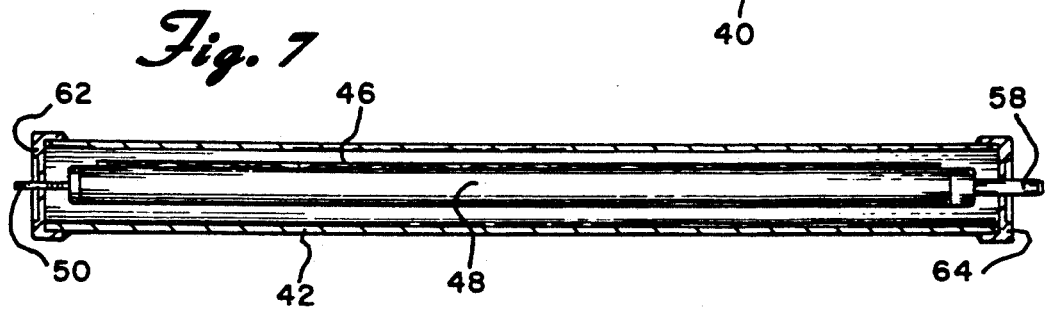
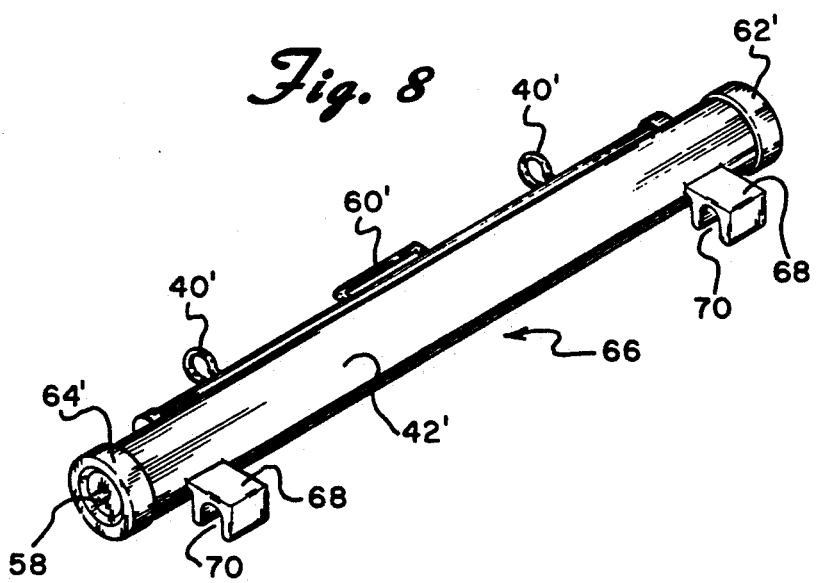

METHOD FOR COVERING SHOPPING CARTS

BACKGROUND OF THE INVENTION

This invention involves an apparatus and a method of using a cover that can be unrolled to cover the contents exposed in an open basket shopping cart.

Certain things are not popular about shopping, particularly when the quantity of goods and the type of goods requires the use of a shopping cart to transport the parcels from the store to the shopper's motor vehicle. First, at a typical supermarket, the articles purchased, generally including food stuffs, toiletries, paper goods, and cleaning articles are still commonly packaged in semi-perishable containers and then inserted into paper bags which are then used to carry the smaller items combined in bag. Degradable paper bags are still preferred in order to provide quick degradation in landfills and other trash disposal procedures. Unfortunately, the very advantages of biodegradation of paper bags also makes them extremely susceptible to rain water. Thus, shoppers either avoid shopping on rainy days or suffer the likelihood that the paper bags will lose strength, tear and drop the groceries on the ground. Further, many food stuffs are quickly perishable in the direct sunlight and it is difficult to get ice cream home on a hot sunny day without substantial melting.

While covers have been provided for open topped pickup trucks and the like, no devices or apparatuses have been provided for protection of goods in shopping carts. The prior art devices do not satisfy the above needs nor do they attain the objects described hereinbelow.

SUMMARY OF THE INVENTION

It is an object of the present invention to provide an apparatus and method that will provide protection for shopper's goods in a shopping cart with protection from the effects of weather.

It is a particular object of the present invention to provide an apparatus that can be permanently attached to a shopping cart, that will remain out of the way when not in use and yet be easily extended over the open frame of the shopping cart basket to protect the goods in the basket.

It is a particular object of the present invention to provide an apparatus to cover the goods in a shopping basket without interfering with the use of the infant child seat disposed to the rear of the shopping basket, such that the infant can still stay in the chair while the goods are protected from the elements.

It is an additional particular object of the present invention to provide a cover which is attachable to a standard shopping cart to cover the groceries in the shopping cart, even though they might be piled well above the upper edges of the open frame of the cart basket.

An aspect of the invention is a cover apparatus for covering a shopping cart with a basket with an open top frame having a rear end top edge and a front end top edge. The cover apparatus includes spring roller assembly means including a spring loaded roller, and attachment means to attach the spring roller assembly means proximate to an end top edge of the basket. The cover apparatus further includes a flexible retractable cover dimensioned to cover the open top frame of the basket and including a rear end attached to the spring roller assembly means and a free front end extendable from the spring roller assembly means toward the opposite end top edge of the basket. The spring roller assembly means biases against rotation of the roller in unrolling the cover from the roller to retract the cover on the roller. The cover apparatus also includes hook means to detachably attach the front end of the cover to the end wall of the basket opposite the end wall to which the spring roller assembly means is attached when the cover is extended over the top frame.

It is preferred that the shopping cart further include a rear section of the basket with the rear end top edge proximate a horizontal handle and a frontwardly pivoting back rest for an infant seat, and a front end wall of the basket terminating with the front end top edge of the frame, that the attachment means attaches the spring roller assembly means proximate to the rear section of the basket, and that the hook means detachably attaches the front end of the cover to the front end wall of the basket when the cover is extended over the top frame. It is further preferred that the apparatus further include an elongated housing enclosing the spring roller assembly means and that the attachment means attaches the housing to the shopping cart. It is also preferred that the attachment means include at least one hook attachable of the shopping cart. It is further preferred that the attachment means provide permanent attachment of the spring roller assembly means to the shopping cart. It is also preferred that the shopping cart further include a rear section proximate the rear end top edge with a horizontal handle and a forwardly pivoting back rest for an infant seat, and that the attachment means provides permanent attachement of the spring roller assembly means to a top edge of the back rest of the infant seat of the shopping cart. It is further preferred that the cover be tapered with the front end having a narrower width than the rear end. It is also preferred that the cover be constructed of woven cloth reinforced plasticized polyvinyl chloride film. It is further preferred that the spring roller assembly means further include stop means to selectively stop biasing against the unrolling of the cover. It is also preferred that the hook means include a plurality of hooks positioned to hook onto the front end top edge.

Another aspect of the invention is a cover apparatus for covering a shopping cart that includes a basket with an open top frame, a rear section with a horizontal handle and a frontwardly pivoting back rest for an infant seat, and a front end wall of the basket with a front end top edge of the frame. The cover apparatus includes an elongated housing, spring roller assembly means enclosed in the elongated housing said means including a spring loaded roller, and attachment means to permanently attach the elongated housing to the back rest of the shopping cart. The device further includes a flexible retractable cover dimensioned to cover the open top frame of the basket cover, tapered with the front end having a narrower width than the rear end, and including a rear end attached to the spring roller assembly means and a front end extendable from the spring roller assembly means toward the front end wall of the basket. The spring roller assembly means biases against rotation of the roller in unrolling the cover from the roller to retract the cover on the roller and further includes stop means to selectively stop biasing against the unrolling of the cover. The device also includes hooks on the front end of the cover of sufficient size and shape to detachably attach to hook onto the front end top edge of the front wall of the basket when the cover is extended over the top frame.

Yet another aspect of the invention is a method for covering a shopping cart that includes a basket with an open top frame with a rear end top edge and a front end top edge, a rear section proximate the rear end top edge with a horizontal handle and a forward pivoting back rest for an infant seat. The method includes providing a cover apparatus that includes spring roller assembly means that includes a spring loaded roller, and a flexible retractable cover dimensioned to cover the open top frame of the basket and including a rear end attached to the spring roller assembly means and a free front end, wherein the spring roller assembly means biases against rotation of the roller in unrolling the cover from the roller to retract the cover on the roller. The apparatus also includes attachment means attaching the spring roller assembly means proximate to an end top edge of the basket. The method further includes unrolling the cover pulling the front end of the cover from the spring roller assembly means toward the opposite end top edge of the basket to extend the cover over the top frame, and detachably attaching the front end of the cover to an end wall of the basket opposite the end wall to which the spring roller assembly means is attached.

BRIEF DESCRIPTION OF THE DRAWINGS

FIG. 3 is a partial vertical cross-sectional view taken along line 3 of FIG. 1.

FIG. 4 is a top rear perspective view of the device illustrated in FIG. 1.

FIG. 5 is a top frontal perspective view of the device illustrated in FIG. 4.

FIG. 6 is a partial cutaway perspective view of the opposite end of the device illustrated in FIG. 4 with the cover pulled out of the housing.

FIG. 7 is a cross-sectional view taken along lines 7—7 of FIG. 6.

FIG. 8 is a perspective view of a second embodiment of a device of the present invention.

DESCRIPTION OF THE PREFERRED EMBODIMENTS

Figure 1:
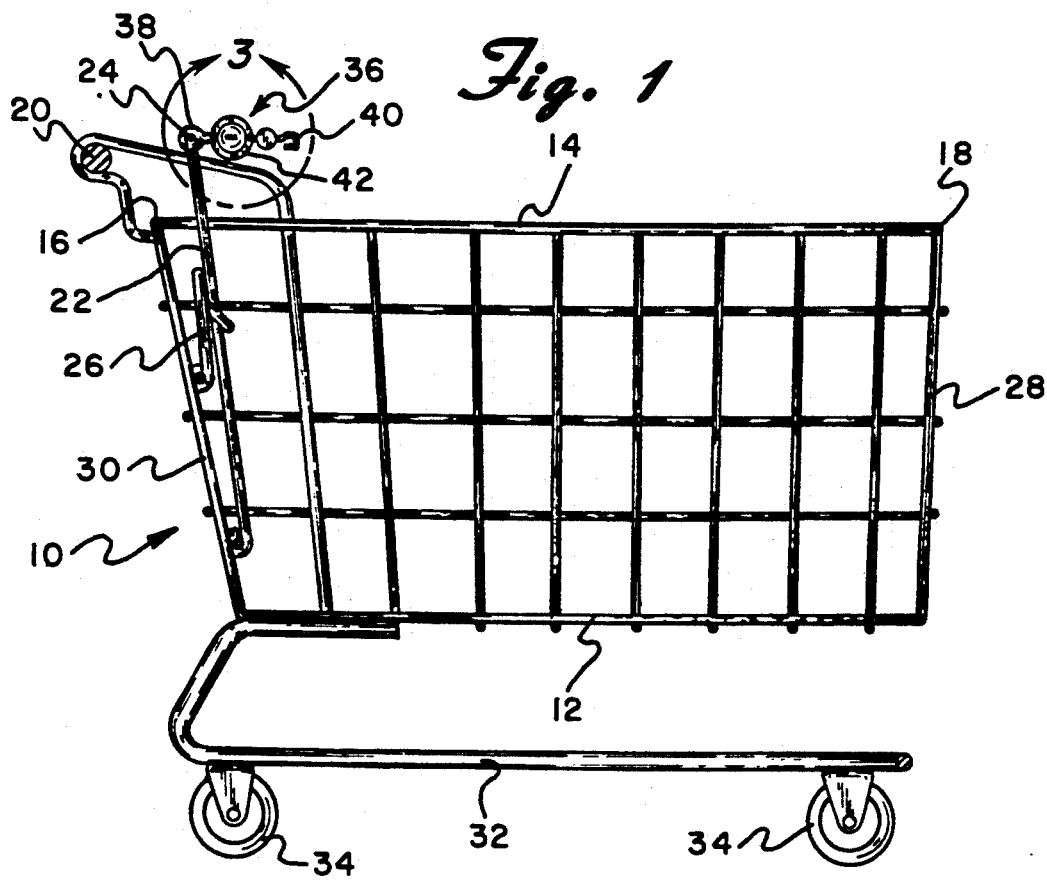
FIG. 1 is a side elevational view of a standard shopping cart basket with a device of the present invention attached to the upper edge of the tiltable infant seat back rest.
Figure 2:
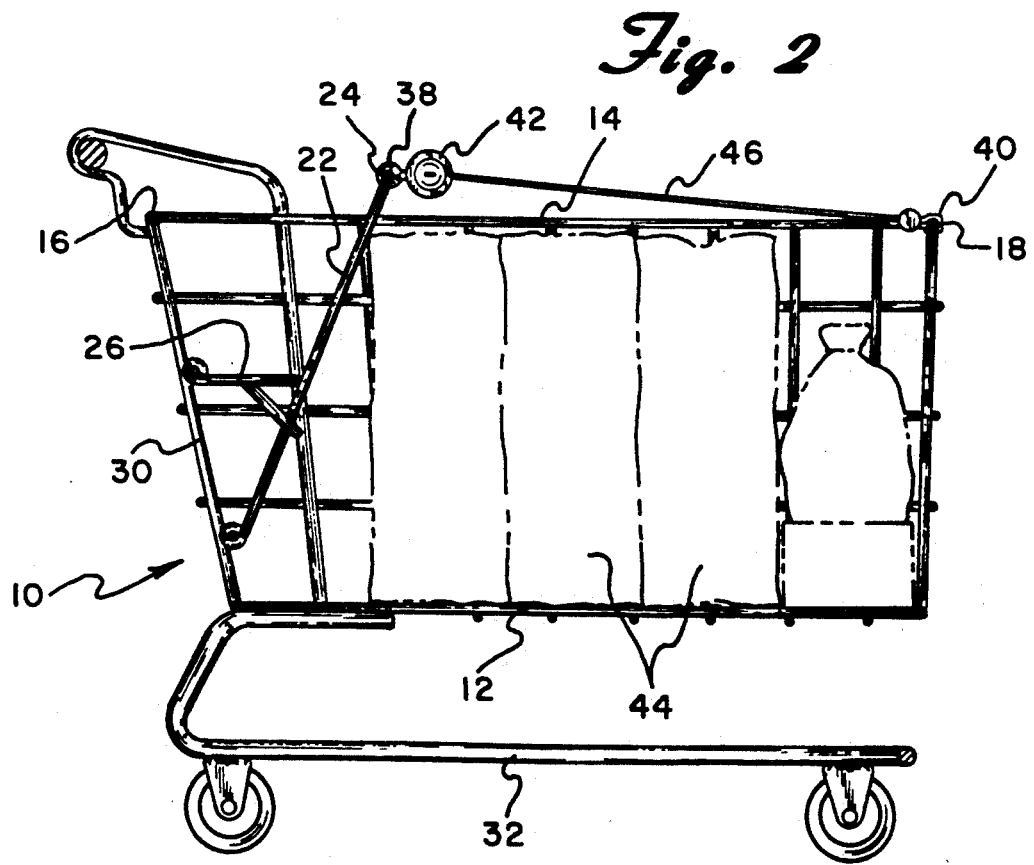
FIG. 2 is a side elevation view of the shopping cart and device illustrated in FIG. 1 with the cover partially unrolled and attached to the front of the cart to protect groceries in the open basket.

In FIG. 1, standard shopping cart 10 includes chrome plated steel basket 12 with upper open frame 14 which includes rear top end edge 16 and front top end edge 18. Horizontal handle 20 is used to push and guide the cart riding on wheels 34. Most shopping carts including cart 10 include infant seat back 22 with upper edge 24 pivotable frontwardly to bring seat 26 into a horizontal position on which the infant sits. Basket 12 includes front wall 28 and rear wall 30 and is supported on base frame 32. Apparatus 36 is attached through rear hooks 38 to top horizontal edge member 24 of back 22. In this view the infant seat is not being used. Housing 42 is supported on member 24 by hooks 38 with front hooks 40 extending forwardly. In FIG. 2, groceries 44 have been placed in basket 12 and in order to protect those groceries, cover sheet 46 has been unrolled by pulling the forward end and hooking hooks 40 over front end top edge member 18. In this case, infant seat back 22 has been allowed to pivot frontwardly to bring infant seat 26 into the horizontal and usable position to support an infant. It is an easy matter to hold infant seat back 22 to the rear against rear wall 30 while cover sheet 46 is being unrolled. Thus, if the infant seat is not needed, cover sheet 46 may extend over the entire opening of upper frame 14. Further, bags 44 may extend over and above upper frame 14 and still be covered by cover sheet 46. In FIG. 3, roller 48 is exposed with most of cover sheet 46 rolled around it and extending out of housing 42 through slot 52. Flexible rubber strip wiper blade 53 is adhesively attached the entire length along the top edge of slot 52 extending downwardly over slot 45 to wipe water collecting on the top of cover sheet 46. Actuator flat pin 50 extends out from the end of roller 48 and is connected to ratchet gear teeth and spring mechanism of the standard window shade apparatus. Thus, leading edge support rod 54 attached through gripping mechanism 56 to the front free end of cover sheet 46 may be pulled to unroll cover sheet 46 and pull it out of slot 52 to the desired length. It is possible to pull the cover sheet out and still retain a slight amount of bias tension to hold hook 40 over horizontal frame member 18. Cover sheet 46 is constructed of ultraviolet light stabilized 20 mil thick plasticized polyvinyl chloride film. Other durable tear resistant flexible films, such as polypropylene, are also satisfactory. Hooks 38 are permanently formed and attached around top seat back member 24. As shown in FIG. 4, both hooks 38 are attachable to horizontal member 24 and cover sheet 46 is easily unrolled by pulling on handle 60. Hooks 40 and handle 60 may be combined in one member to reduce the number of parts in the device. Although not shown, drain holes on the bottom of housing 42 are provided. As shown in FIG. 5, slot 52 is slightly exposed as the width of the front edge of cover sheet 46 is narrower than the rear edge. As shown in FIG. 6, with cover sheet 46 fully extended, the width of cover sheet 46 essentially spans the entire width of slot 52. Rotating pin 58 extends out of a circular hole in end cap 64 of housing 42. Flat actuator pin 50 extends out through a slot of essentially the same size through end cap 62 of the housing. When cover sheet 46 is pulled outwardly, roller 48 rotates on pin 58 while actuator pin 50 remains stationary and actuates the ratchet and spring mechanism of the standard window shade inside roller 48 not pictured for clarification purposes. FIG. 8 is a second embodiment wherein apparatus 66 is essentially identical to that of apparatus 36 except that hooks 68 are molded plastic attached directly to housing 42', the "prime" designations indicating parts identical to that of the earlier embodiment. Openings 70 of hooks 68 are constructed to interfit over either handle 20, rear end top edge 16, front end top edge 18, or top edge 24 of the infant seat, as a temporary attachment. This embodiment is generally retained by the shopper and is attached to the shopping cart on rainy or hot sunny days when use is desired. After use, it is removed and carried in the shopper's motor vehicle.

While this invention has been described with reference to the specific embodiments disclosed herein, it is not confined to the details set forth and the patent is intended to include modifications and changes which may come within and extend from the following claims.

I claim:

1. A method for covering a shopping cart comprising a basket comprising an open top frame with a rear end top edge and a front end top edge, a rear section proximate the rear end top edge with a horizontal handle and a forward pivoting back rest for an infant seat, the method comprising:
(a) providing a cover apparatus comprising:
  (i) spring roller assembly means comprising a spring loaded roller,
  (ii) a flexible retractable cover dimensioned to cover the open top frame of the basket and comprising a rear end attached to the spring roller assembly means and a free front end,
  wherein the spring roller assembly means biases against rotation of the roller in unrolling the cover from the roller to retract the cover on the roller, and
  (iii) attachment means attaching the spring roller assembly means proximate to an end top edge of the basket,
(b) unrolling the cover pulling the front end of the cover from the spring roller assembly means toward the opposite end top edge of the basket to extend the cover over the top frame, and
(c) detachably attaching the front end of the cover to an end wall of the basket opposite the end wall to which the spring roller assembly means is attached.

2. The method of claim 1 wherein the apparatus further comprises an elongated housing enclosing the spring roller assembly means and the method further comprises using the attachment means to attach the housing to the shopping cart.

3. The method of claim 1 wherein the attachment means comprises at least one hook attachable of the shopping cart.

4. The method of claim 1 wherein the attachment means provides permanent attachment of the spring roller assembly means to the shopping cart.

5. The method of claim 1 wherein the cover is tapered with the front end having a narrower width than the rear end.

6. The method of claim 1 wherein the cover is constructed of woven cloth reinforced plasticized polyvinyl chloride film.

7. The method of claim 1 wherein the attachment means comprises a plurality of hooks positioned to hook onto the front end top edge and the method further comprises hooking the hooks onto the front end top edge.

8. A method for covering a shopping cart comprising a basket comprising an open top frame with a rear end top edge and a front end top edge, a rear section proximate the rear end top edge with a horizontal handle and a forward pivoting back rest for an infant seat, the method comprising:
(a) providing a cover apparatus comprising:
  (i) an elongated housing,
  (ii) spring roller assembly means enclosed in the elongated housing said means comprising a spring loaded roller,
  (iii) attachment means to permanently attach the elongated housing to the back rest of the shopping cart,
  (iv) a flexible retractable cover dimensioned to cover the open top frame of the basket cover, tapered with the front end having a narrower width than the rear end, and comprising a rear end attached to the spring roller assembly means and a front end extendable from the spring roller assembly means toward the front end wall of the basket,
  wherein the spring roller assembly means biases against rotation of the roller in unrolling the cover from the roller to retract the cover on the roller and further comprises stop means to selectively stop biasing against the unrolling of the cover, and
  (v) hooks on the front end of the cover of sufficient size and shape to detachably attach to hook onto the front end top edge of the front wall of the basket when the cover is extended over the top frame,
(b) unrolling the cover pulling the front end of the cover from the spring roller assembly means toward the front end top edge of the basket to extend the cover over the top frame, and
(c) detachably attaching the front end of the cover to the front end wall of the basket.

* * * * *